United States Patent [19]
Claypool

[11] Patent Number: 5,184,396
[45] Date of Patent: Feb. 9, 1993

[54] APPARATUS FOR MAKING A NOVEL SOLAR COLLECTOR

[76] Inventor: James P. Claypool, 1044 E. Cook Ave., St. Paul, Minn. 55106

[21] Appl. No.: 718,334

[22] Filed: Jun. 18, 1991

[51] Int. Cl.⁵ .......................... B23P 15/26; B26D 7/10
[52] U.S. Cl. ................................ 29/726; 29/890.033; 83/171; 83/651.1
[58] Field of Search .......... 29/726, 890.033, DIG. 55, 29/DIG. 57, DIG. 65, 727; 52/82, 577; 83/171, 651.1, 861, 862; 165/171, 175, 905; 126/438, 439, 448

[56] References Cited

U.S. PATENT DOCUMENTS

| | | | |
|---|---|---|---|
| Re. 31,479 | 1/1984 | Lewis | 83/171 X |
| 2,232,122 | 2/1941 | Lindman | 83/651.1 |
| 3,117,211 | 1/1964 | Tansey | 83/171 |
| 3,756,111 | 9/1973 | Weidenmiller | 83/651.1 |
| 3,757,617 | 9/1973 | Fabbri | 83/171 X |
| 3,757,623 | 9/1973 | Wiewel | 83/651.1 X |
| 4,213,929 | 7/1980 | Dobson | 52/577 X |
| 4,244,256 | 1/1981 | Jakobsson et al. | 83/651.1 X |
| 4,301,702 | 11/1981 | Collier | 83/171 X |
| 4,331,503 | 2/1982 | Benjamin | 156/633 |

Primary Examiner—Joseph M. Gorski
Assistant Examiner—Peter Dungba Vo
Attorney, Agent, or Firm—Oldham, Oldham & Wilson Co.

[57] ABSTRACT

This invention is a novel technique for making a solar energy collector in a fresnel configuration by using unique hot-wire tools. This process uses either a hot-wire radial cutter to produce concentric grooves and a hot-wire beveled cutter to produce angled concentric surfaces in a base material in combination, or a hot-wire combination cutter to simultaneously produce a single concentric and angled concentric surface in a base material. This shaped base material is now suitable for affixing reflective material.

14 Claims, 10 Drawing Sheets

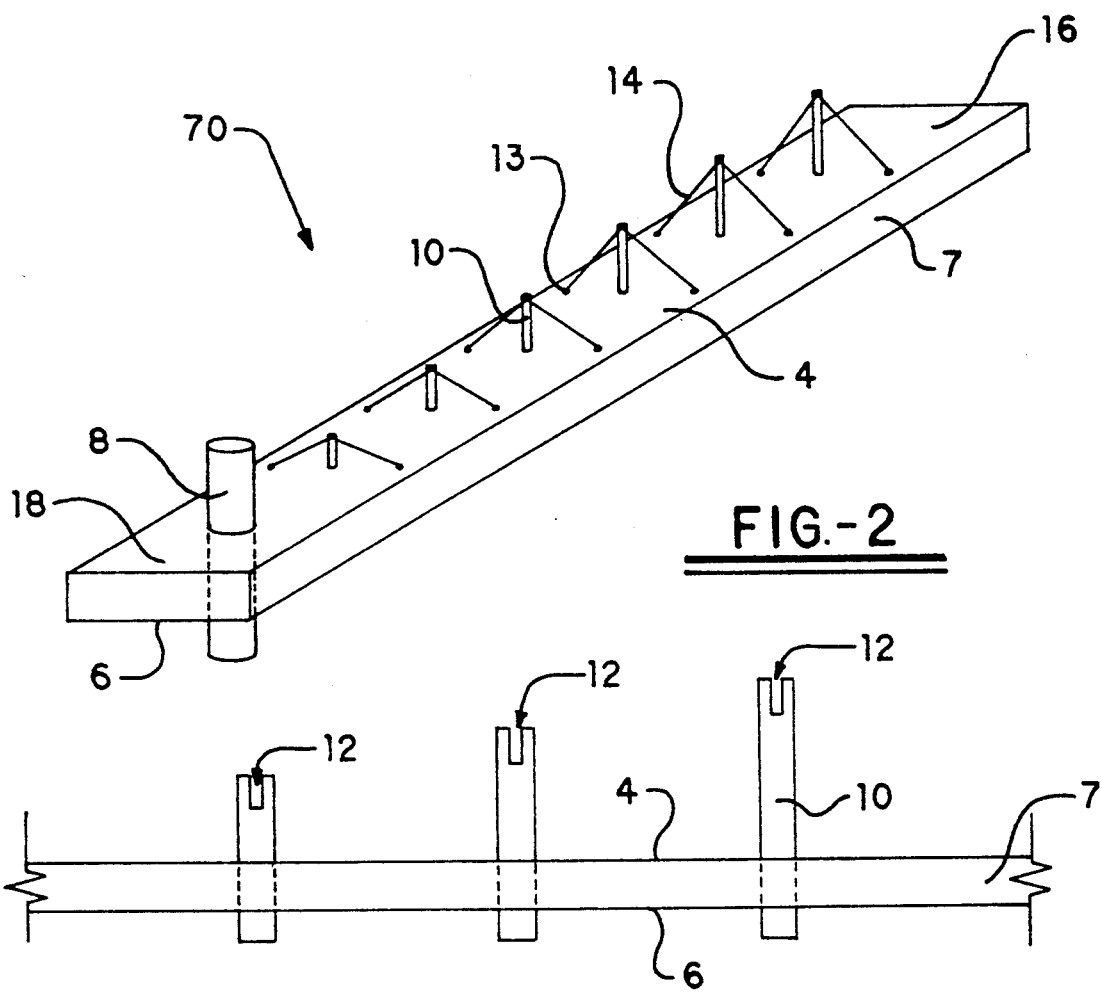
FIG.-2
FIG.-3
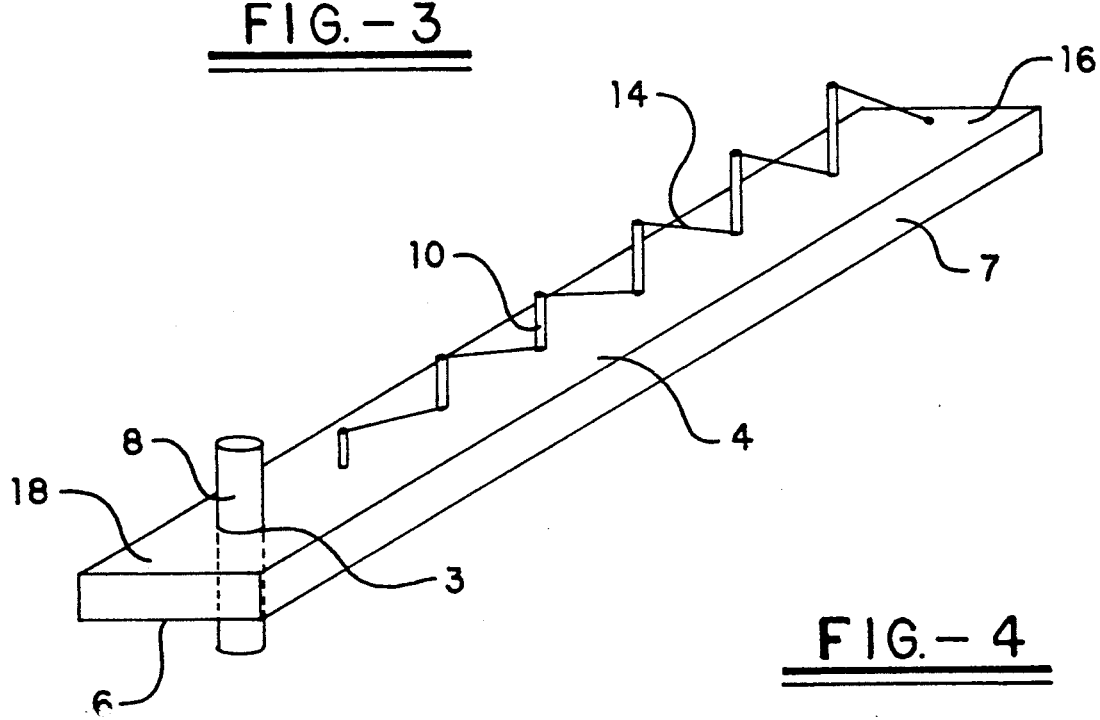
FIG.-4

5,184,396

APPARATUS FOR MAKING A NOVEL SOLAR COLLECTOR

TECHNICAL FIELD

The present invention relates to a method of making a solar energy collecting device in a fresnel mirror configuration by using unique hot-wire tools. More specifically, it relates to a process which uses a hot-wire radial cutter to produce concentric grooves and a hot-wire beveled cutter to produce angled concentric surfaces. Alternatively, it relates to a process which uses a hot-wire combination cutter to produce a single concentric groove and anfled concentric surface. The resulting shaped base material is suitable for affixing reflective material thereupon.

BACKGROUND OF THE INVENTION

People have harnessed the sun's energy since ancient times. By circa 400 B.C.E., the Greeks knew that glass spheres filled with water could concentrate the sun's rays and start fires. By circa 200 B.C.E. the Greeks and Chinese used curved mirrors to light fires with sunlight.

From 900 C.E. to about 1300 C.E. the Anasazi Indians of what is now the southwestern U.S., built dwellings with massive south facing stone or adobe walls. These walls absorbed heat during the day and released it at night.

Modern, flat plate collectors evolved from early experiments with hot boxes. Horace de Benedict de Saussure, a Swiss scientist, built the first hot box in 1767. He used a glass covered wooden box with cork insulation to collect sunlight. William J. Bailey, an American engineer, developed the first flat plate collector in California in 1909.

In 1940, George Fred Keck, an American architect, built the first modern passive solar home in a Chicago suburb. Most of the south wall was covered by windows made of two panes of glass with a thin layer of air sealed between them. Engineers at Bell Telephone laboratories created on efficient photovoltaic cell in 1954.

During the 1970's and 1980's shortages of oil and natural gas led to the development of more efficient solar technology. In some areas, new solar homes have become an economical alternative to homes heated with gas or electricity. Experts believe that, as people use direct solar energy more and more, the mass production of solar equipment and the development of better equipment, will steadily improve the economic advantages of using direct solar energy.

SUMMARY OF THE INVENTION

The present invention, generally stated, provides an inexpensive method for making a device for collecting solar energy using unique hot-wire tools. More specifically, the purpose of the present invention is to provide a method of making a device that can be constructed out of light-weight, low-cost materials, such as an expanded cellular polystyrene, (e.g. STYROFOAM TM, commercially available from Dow Chemical Co., Midland, Mich.) to collect and concentrate solar energy.

It is a further object of the present invention to provide the necessary parts to construct the solar concentrating reflector in a kit form to be sold commercially. These and other objects and advantages of the present invention will become more readily apparent from the more detailed description of the preferred embodiment taken in conjunction with the drawings.

BRIEF DESCRIPTION OF DRAWINGS

FIG. 2 illustrates a hot-wire radial cutter, shown upside down, used for creating concentric vertical cuts on solar collector base material used in building a solar device in perspective.

FIG. 3 illustrates an enlarged partial side view of two sequential support pins of a hot-wire radial cutter, with the resistance wire removed for clarity, in greater detail.

FIG. 4 illustrates a hot-wire beveled cutter, shown upside down, used for creating angled concentric rings on a solar collector base material used for a solar device in perspective.

DETAILED DESCRIPTION OF THE INVENTION

Figure 1:
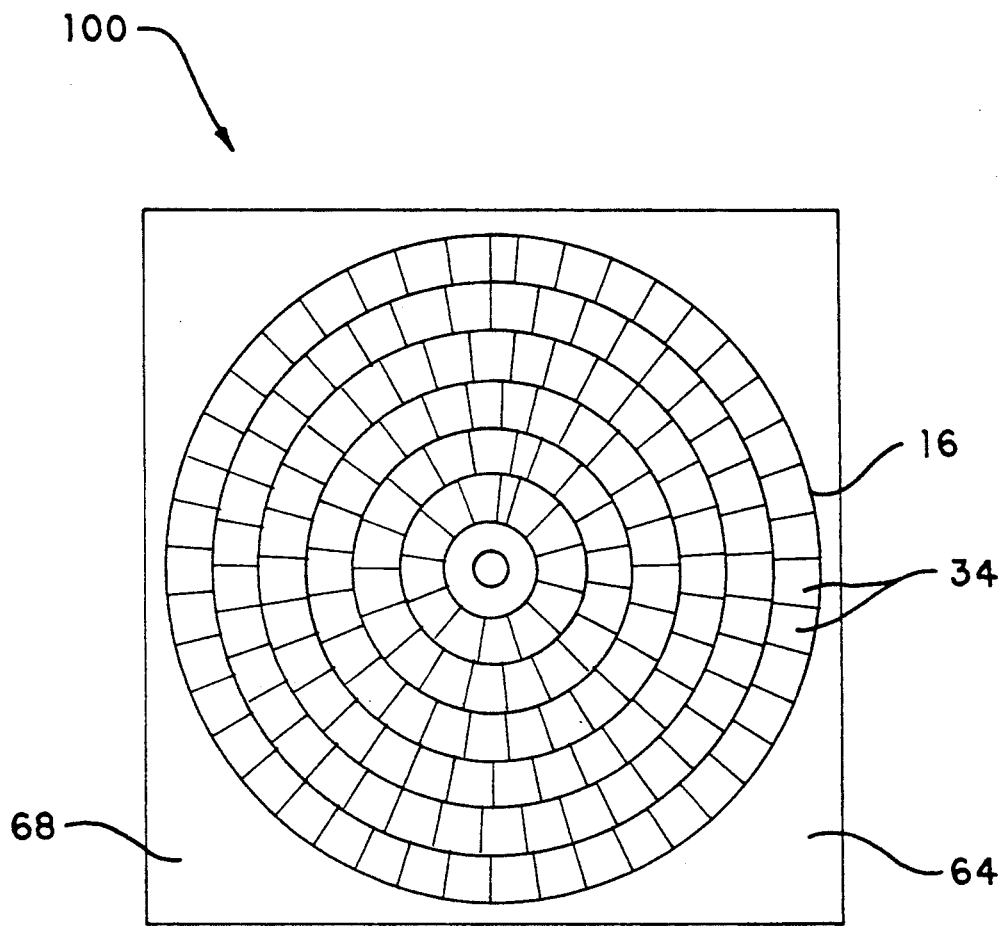
FIG. 1 illustrates a top view of the completed solar collector with reflective material fastened on top of the solar collector base material.

This invention will be described in detail with reference to the preferred embodiment thereof. Like elements are identified by like reference numerals throughout the drawings and specification.

Solar collector 100 in the present invention is constructed by either using hot-wire radial cutter 70 in combination with hot-wire beveled cutter 80, or by using hot-wire combination cutter 110. These hot-wire cutters (FIGS. 2,4,12) are comprised of tool base 7 that is preferably 4" wide, 30" long and ¾" thick. Other base dimensions of these hot-wire cutters (70, 80, 110) can be used in the construction of solar collector 100 and still be within the spirit of the invention. The selection of the tool base material is not critical, although a degree of rigidity must be inherent in the material of construction. A typical material would be wood or rigid polymer.

In a first embodiment of the invention, FIG. 2, hot-wire radial cutter 70 has first surface 4, second surface 6, and two ends 16, 18. First surface 4 contains pins 10 of varying lengths with an open slot 12 at each pin extremity as shown in FIG. 3. Pins 10 are spaced at predetermined distances and extend vertically from first surface 4. The length of each pin 10 is determined by simple geometry, as described below.

Figure 15:
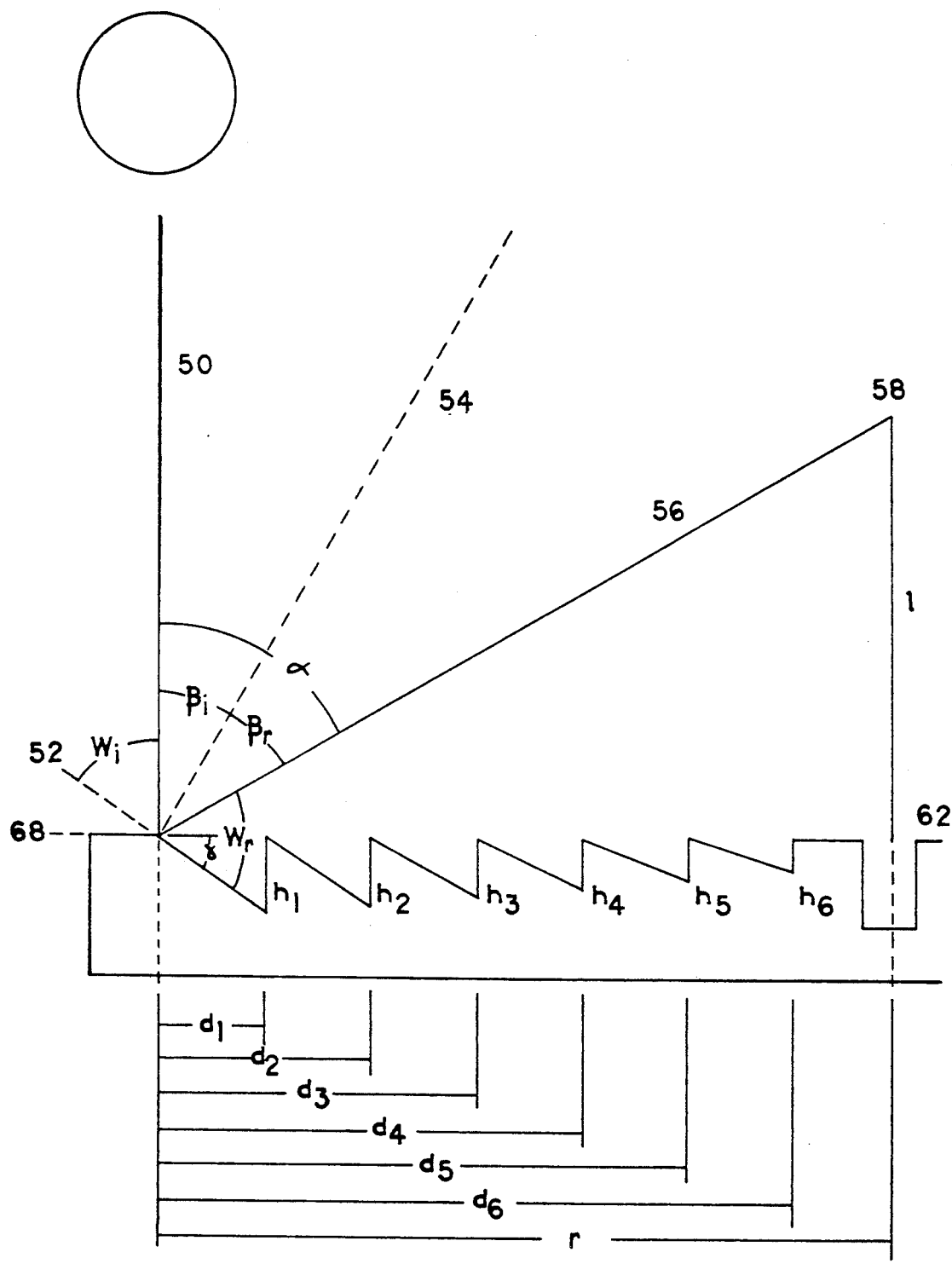
FIG. 15 illustrates a side-view of the solar collector base material with suitable angle determinations exemplified.

In using the tools of the instant invention, it is critical calculate angle $\gamma$. This angle must be such that when the sun's rays impinge upon the surface of solar collector 100, the light will be reflected and concentrated at focal point 58. Using FIG. 15 to illustrate, angle $\theta$ is calculated by dividing mirror focal length (1) by distance (r), which in this case represents the outermost ring radius. Using the formula, $\theta = \arctan$ (mirror focal length (1) / ring radius (r)) will yield the value of the angle in degrees. Applying elementary principles of physics, the angle of incidence $\omega_i$ of light ray 50 must equal the angle of reflectance $\omega_r$ normal to surface 52, to enable reflected light ray 56 to collate at focal point 58. Since light ray 50 and top surface 68 are perpendicular to each other, angle $\alpha$ can be calculated by subtracting angle $\theta$ from 90°. Since normal line 54 is perpendicular to reference line 52 which is created by linearly extending angled concentric surface 22, angle $\beta_i$ is equal to angle $\beta_r$. With the equivalence of these angles, it is readily seen that either angle $\beta_i$ or angle $\beta_r$ is exactly ½ angle $\alpha$.

It is now possible to calculate angle $\gamma$ which by nature of the perpendicularity of normal line 54 and reference line 52, is derived by subtracting angles $\theta$ and $\beta_r$ from 90°. By utilizing this value for angle $\gamma$ and the known distance $(d_1)$ from the appropriate ring to the pin, the length of any individual pin can be calculated. The procedure for calculating the each pin length is identical to that described above with appropriate substitutions.

Figure 9:
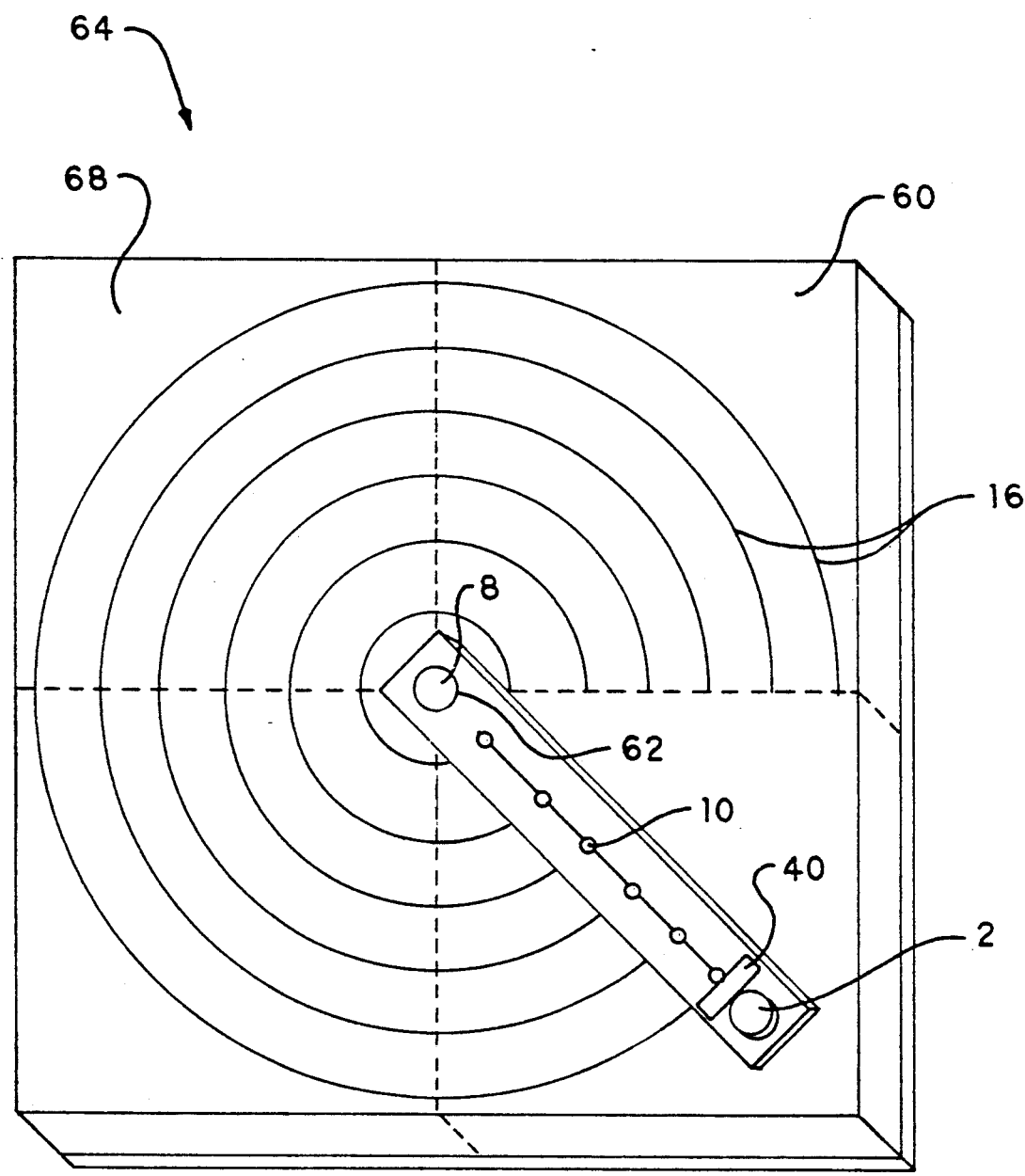
FIG. 9 illustrates a view of the concentric rings made by the hot-wire radial cutter of FIG. 1 in perspective as it would be used in operation.

Hot-wire radial cutter 70, FIG. 2, requires pivot dowel 8 which is inserted through hole 3 near end 18 of tool base 7. Pivot dowel 8 is generally cylindrical in shape and fits with an appropriate degree of looseness so as to permit rotation, into corresponding central hole 62, FIG. 9, which is cut at the intersection of four individual adjacent pieces of solar collector panels 60 to create solar collector base 64 (FIG. 9). While four solar collector panels 60 are described in this example, the invention is not to be construed so as to be limited to this configuration. It is within the spirit of the invention, configurations where one or more collector panels are used as the base.

Solar collector base 64 is typically attached by suitable means, such as glueing, to support surface 66 which provides stability to the configuration. Support surface 66 can be comprised of any fairly rigid material (e.g. wood or rigid polymer). The composition of solar collector panels 60 is governed by considerations of weight and cost. Foamed polymeric materials meet these criteria. In a preferred embodiment, materials such as foamed polystyrene are used.

Figure 6:
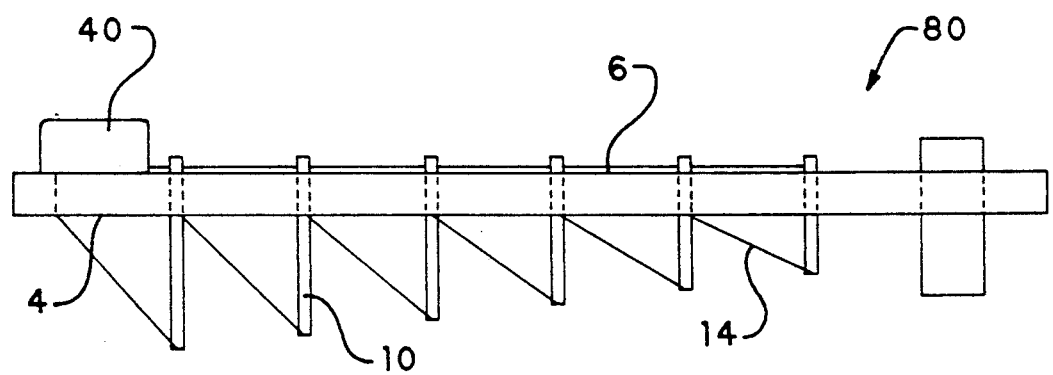
FIG. 6 illustrates a side view of the hot-wire beveled cutter of FIG. 3 as it would be used on top of the surface of the solar collector base material.
Figure 7:
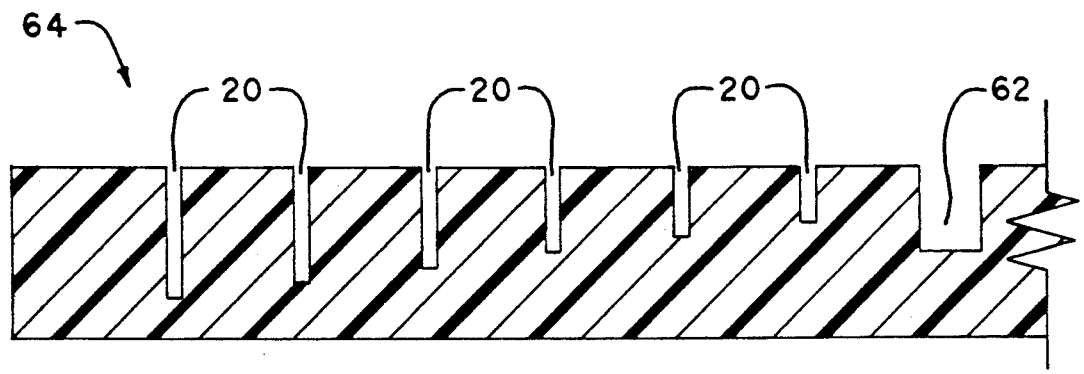
FIG. 7 illustrates a cross-sectional side view of the concentric rings created by the hot-wire radial cutter of FIG. 1.

As partially seen in FIG. 2, hot-wire radial cutter 70 is strung with resistance wire 14 through each of pin slots 12 and wire guidance holes 13 continuously, until resistance wire 14 connects to transformer's secondary coils 44. The resistance wire can be any metal or alloy used for electric resistance purposes. One such example of this type of wire is NICHROME ™, an alloy containing principally, nickel, iron, chronium and small amounts of carbon, commercially available from the Driver-Harris Co., Harrison, N.J. Step-down transformers are well-known in the art and do not constitute a part of the claimed invention. In this application, the transformer is capable of stepping down 120 volt alternating current to 24 volts. Primary coil 42 (not shown) of transformer 40 is connected to an electrical outlet (not shown) which gives the transformer power to heat resistance wire 14. Transformer 40 is typically located on second surface 6 of hot-wire radial cutter 70 as shown in FIG. 6 for hot-wire beveled cutter 80, but would be exactly analogous for hot-wire radial cutter 70. Typical currents carried in the resistance wire powered by the transformer would be in the range of two amps.

Figure 5:
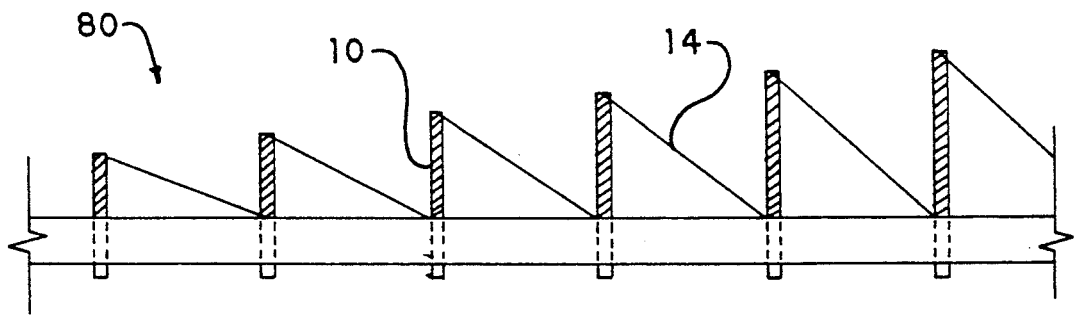
FIG. 5 illustrates a side view of the wrapping pattern of the resistance wire on the support pins of the hot-wire beveled cutter in greater detail.

As seen in FIG. 9, when using hot-wire radial cutter 70, the cutter is positioned with pivot dowel 8 being inserted into central hole 62 of adjacent solar panels 60 which form solar collector base 64. As is shown by the side view of FIG. 5, concentric rings 16 are produced by the following steps. Current is provided to hot-wire radial cutter 70 thereby allowing resistance wire 14 to heat. Referring to FIG. 9, by placing first surface 4 of hot wire radial cutter 70 on top surface 68 of solar collector base 64, and rotating hot-wire radial cutter 70 in a circular direction around pivot dowel 8, a series of concentric rings 16 of varying depths 20 in strategic locations in solar collector base 64 are made (FIG. 6).

The purpose for heating resistance wire 14 is to enable clean cuts to be produced on top surface 68 of solar collector base 64. Heated wire cutting of polymeric foams has been in existence for a long time in making plastic forms and is known in the art.

Figure 16:
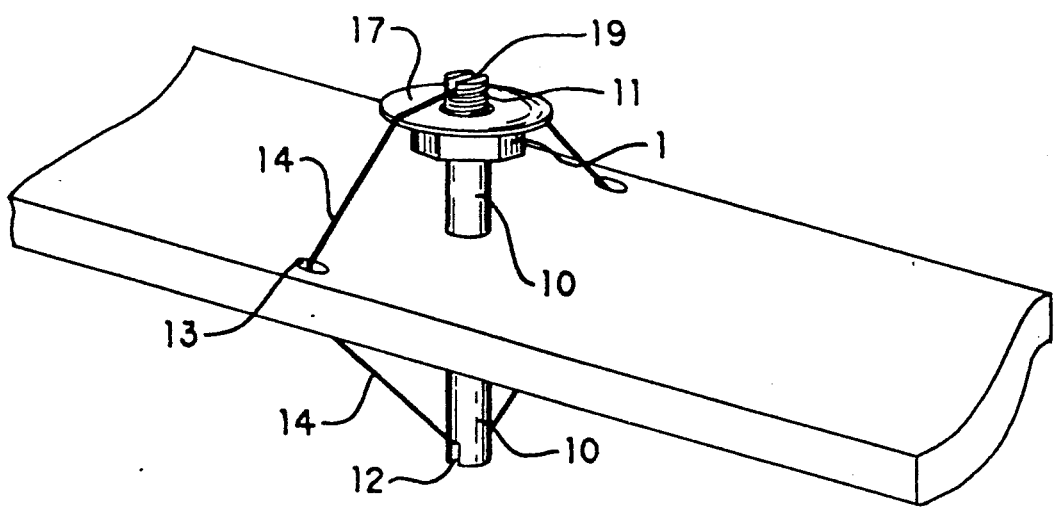
FIG. 16 illustrates a tightening mechanism of hot-wire radial cutter of FIG. 1, in perspective.

The passing of current through resistance wire 14 has the potential of introducing slack in the tension of the wire due to the thermal coefficient of expansion of the material. As seen in FIG. 16, to tighten the heated wire, tightening mechanism 90 is used to restore the original wire tension. By turning nut 1 in an appropriate direction to cause it to move outward on threads 11, typically a counterclockwise direction although it is possible to have non-standardized threads where the appropriate outward direction would require a clockwise direction, washer 17 is thrust outward, thereby taking up any slack which may have become induced into resistance wire 14 by moving it toward pin slot extremity 19.

After the initial vertical concentric rings 16 are created by hot-wire radial cutter 70, a second hot-wire beveled cutter 80 may be constructed so that angled concentric cuts 22 (FIG. 8) can be made. Hot-wire beveled cutter 80 can either be the first embodiment of this invention wherein resistance wire 14' is strung in a second configuration (FIG. 5) or it may be a second hot-wire cutter. In either situation, resistance wire 14' is strung continuously from the extremity of an inner pin 10 at proximal end 18 to the base of adjacent pin 10 moving towards end 16 of hot-wire beveled cutter 80 and terminating at secondary coils 44 of transformer 40.

Figure 8:
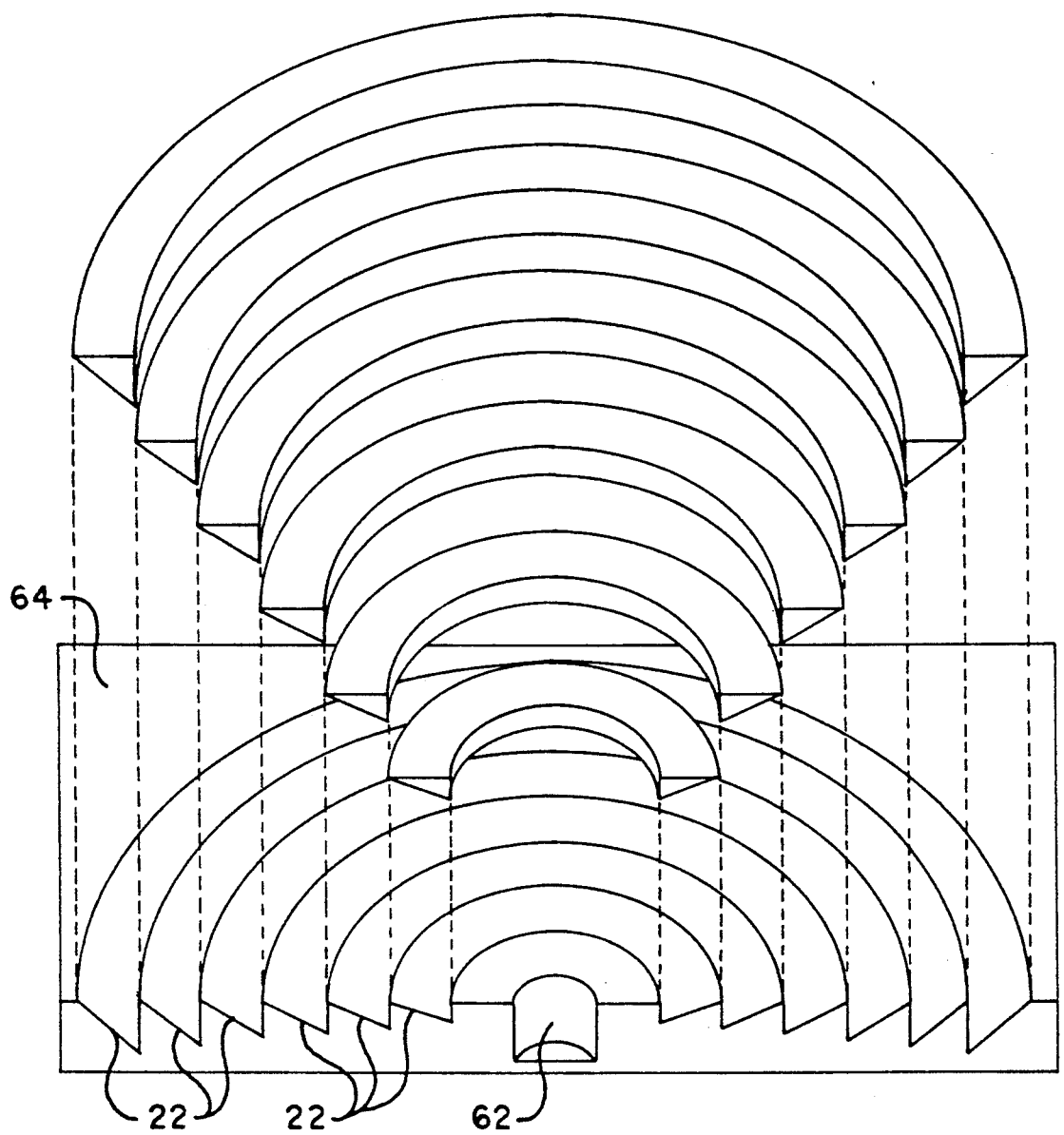
FIG. 8 illustrates a cross-sectional side view of the angled concentric surfaces created by the hot-wire beveled cutter of FIG. 3.
Figure 10:
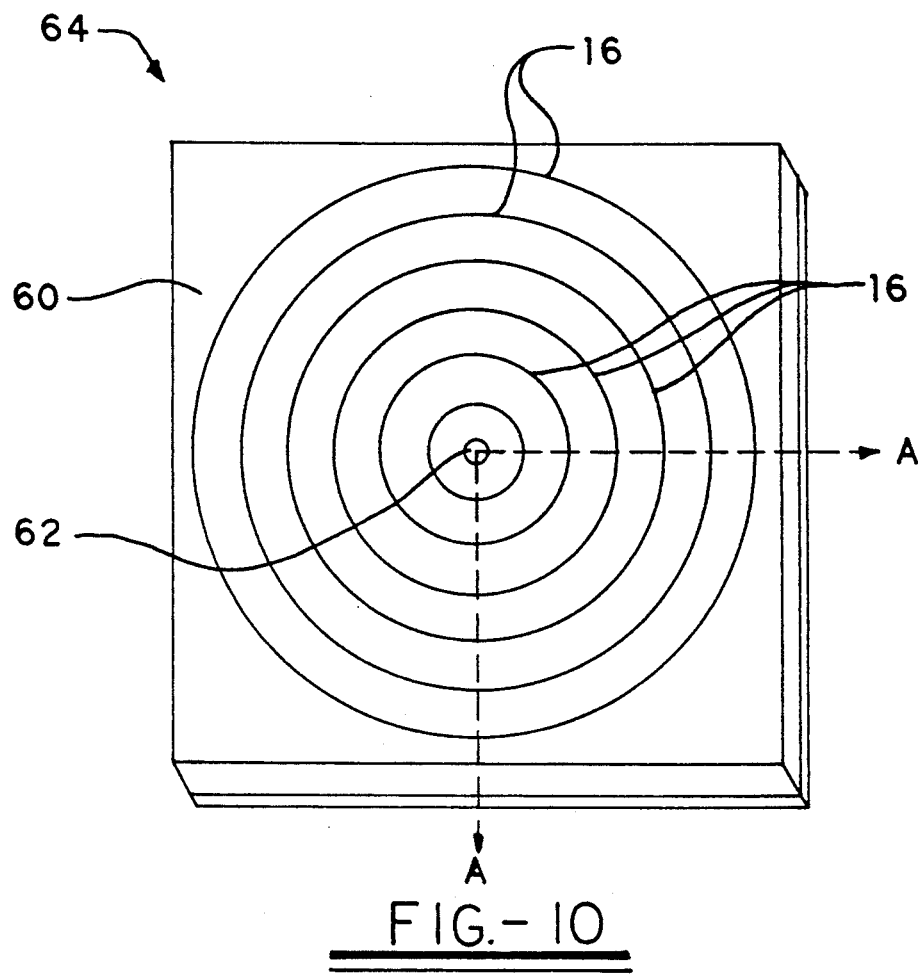
FIG. 10 illustrates a view of the solar collector base produced after radial and bevel cutting according to the present invention in perspective.
Figure 11:
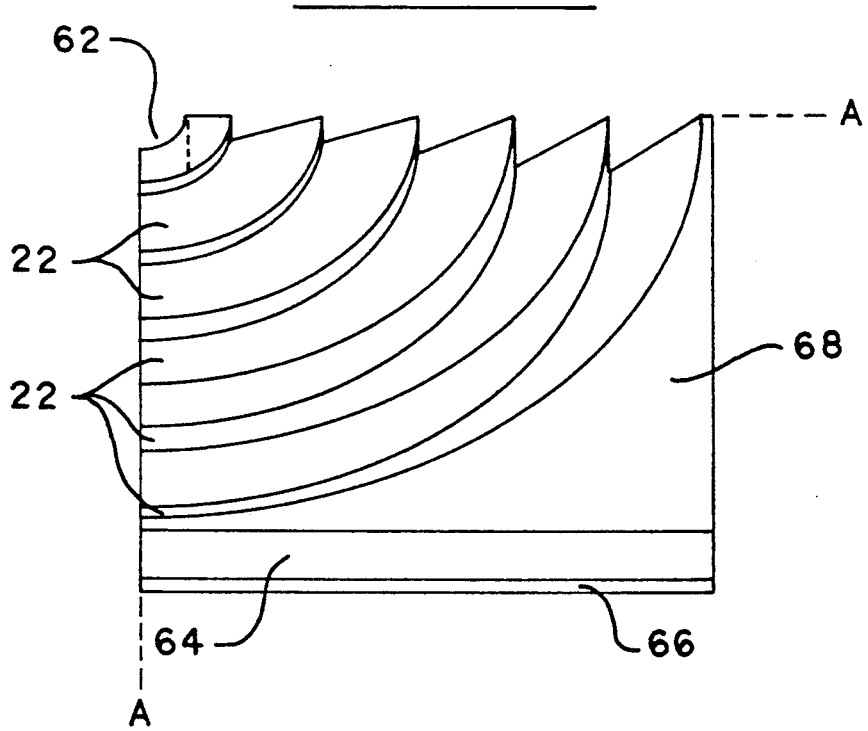
FIG. 11 illustrates an expanded cross-sectional view of both the concentric and angled concentric rings of FIG. 9.

Hot-wire tool 80 is used in an identical fashion to that described for hot-wire tool 70. Pivot dowel 8 is inserted into central hole 62. Current is provided to the hot-wire cutter 80 thereby allowing resistance wire 14' to heat. By placing first surface 4 of hot-wire tool 80 on top surface 68 of base 64, and rotating hot-wire tool 80 in a circular direction, support pins 10 that initially cut the vertical concentric slots 20 will follow those grooves and resistance wire 14' will produce angled concentric cut 22 (FIGS. 10,11). As seen in FIG. 8, there will be a piece of material which will need to be discarded after removal from base material top surface 68.

Figure 12:
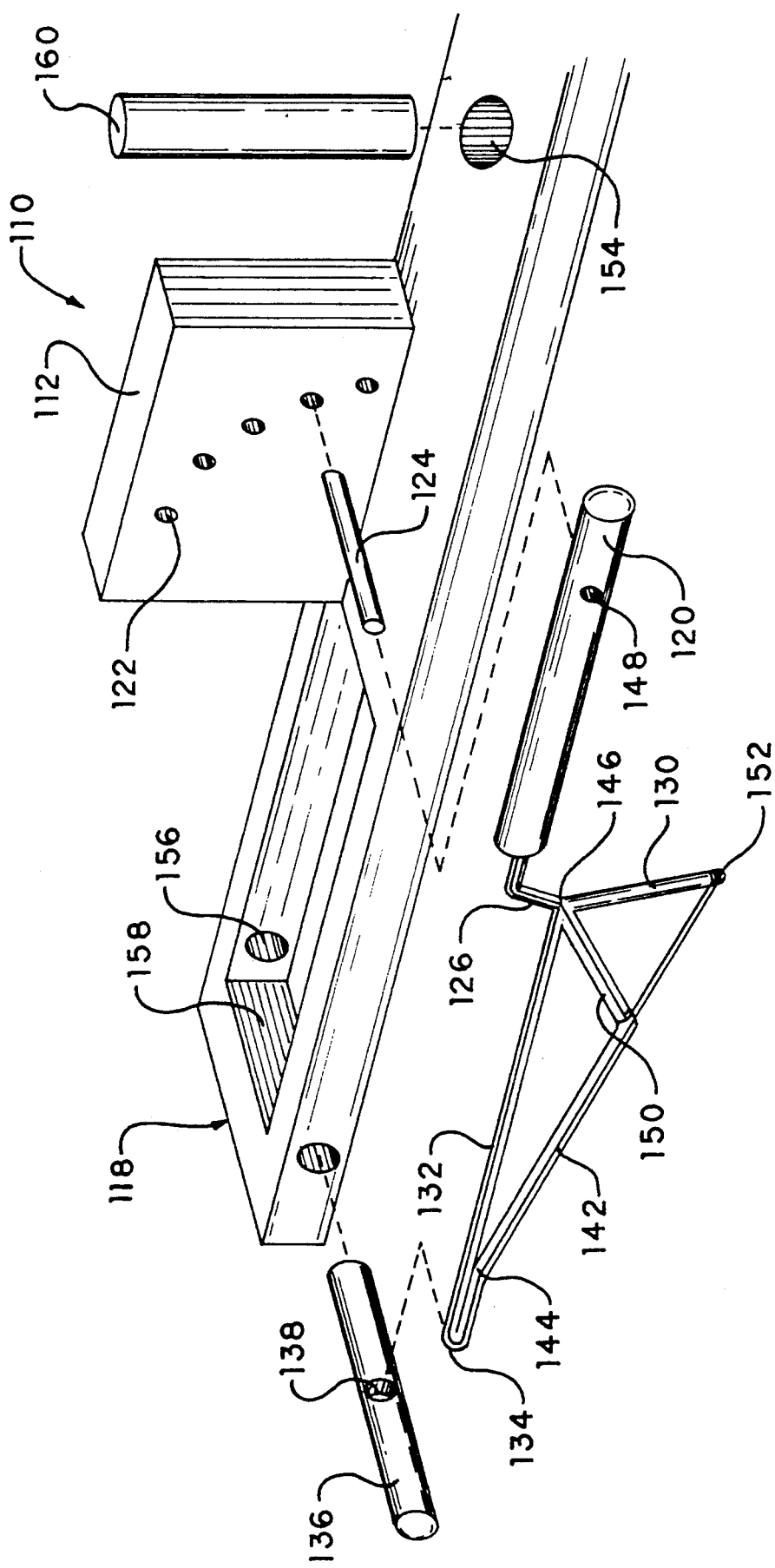
FIG. 12 illustrates a hot-wire combination cutter as it is intended to be used in perspective.

In a second embodiment of this invention, hot-wire combination cutter 110 is configured as in FIG. 12. When using the combination cutter in this arrangement, it is possible to simultaneously make a concentric ring 16 and an angled concentric cut 22. In this embodiment, hot-wire combination cutter 110 is comprised of support strut 126 to which handle 120 is attached at one end and vertical member 128, horizontal member 130, and extension strut 132 are joined at intersection 46. Connecting member 142 attaches to the terminus of horizontal member 130 and joining extension strut 132 at connection point 144, from which both extension strut 132 and connecting member 142 coextend to second end 134. Resistance wire 14" is strung continuously from secondary coils 44 (not shown) of transformer 40 (not shown) along support strut 126 to connection point 144, vertical terminal point 150 of vertical member 128, horizontal terminal point 152 of horizontal member 130, intersection 146, and completes the circuit at secondary coils 44.

In use, combination cutter 110 is inserted into rectangular opening 158 of combination tool base 114. The dimensions and materials of construction of combination tool base 114 are similar to that used for tool base 7 of hot-wire cutters 70, 80. Pivot pin 136, which has hole 138 bored transverse to the longitudinal axis of pivot pin 136 and contained within pivot pin's outer dimensions, is inserted into first pivot hole 140 and into rectangular opening 158. Pivot pin 136 is positioned to receive distal end 134 of combination tool 110, and is secured into combination tool base 114 through second pivot hole 156. Pivot holes 140, 156 being opposing pivot holes.

Combination tool handle 120 is attached to height adjustment block 112 in which are adjustment holes 122, drilled in an arcuate circle at appropriately spaced intervals so as to permit combination tool 110 to cut varying depths as is needed in fabricating concentric rings 16 and beveled angled concentric cuts 22. The exact placement of adjustment holes 122 is determined by the same trignometric considerations described previously in reference to FIG. 15. Pivot dowel 124 is inserted through hole 148 in combination tool handle 120 into the appropriate adjustment hole 122 so as to produce the appropriate cut desired to produce a fresnel lens configuration.

Figure 13:
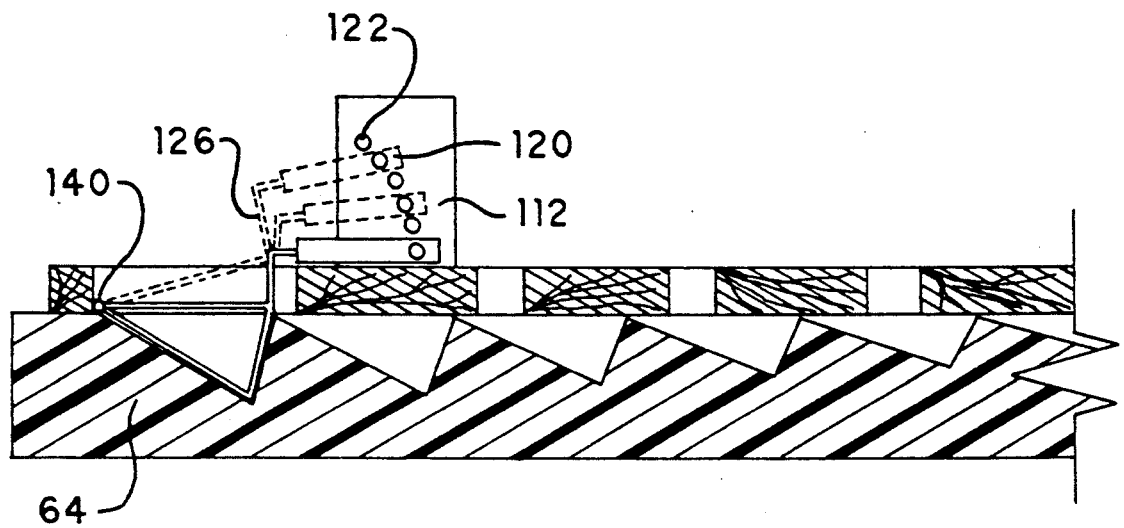
FIG. 13 illustrates a side view of the hot-wire combination cutter on the surface of the solar collector base material.
Figure 14:
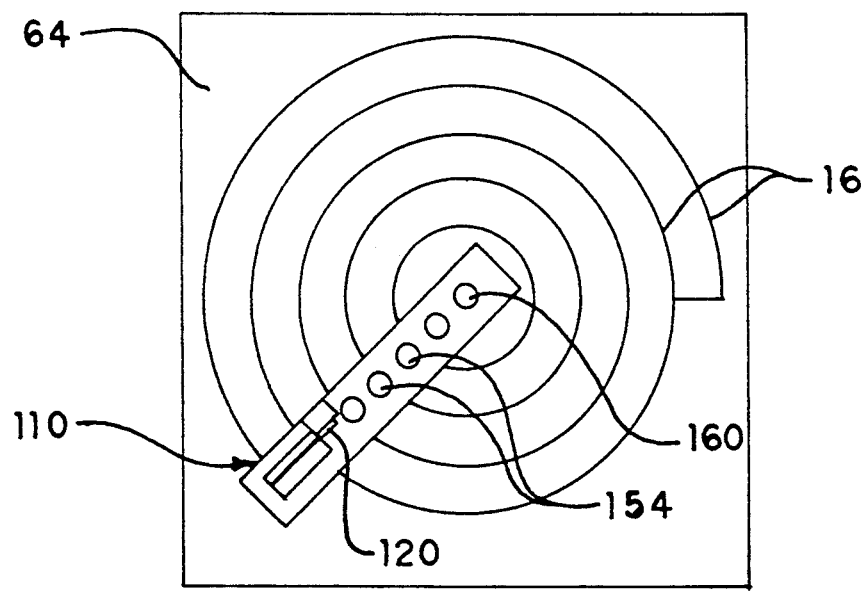
FIG. 14 illustrates a top view of the hot-wire combination cutter producing series of angled concentric rings in the solar collector base material.

The benefit of this embodiment of the invention is that it will permit the creation of two simultaneous cuts in base 64 (FIG. 13). Hot-wire combination cutter 110 is used similarly to that described for hot-wire cutters 70,80. Current is provided to hot-wire combination cutter 110 thereby allowing resistance wire 14" to heat. As seen in FIG. 14, when using hot-wire combination cutter 110, the cutter is positioned with pivot rod 160 being positioned in one of combination base holes 154 into central hole 62 of adjacent solar panels 60 which form solar collector base 64. The selection of combination base hole 154 being dependent on the location of the simultaneous radial and beveled cuts desired. By placing surface 116 of combination tool 110 in contact with top surface 68 of solar collector base 64, and rotating hot-wire combination cutter 110 in a circular direction around pivot rod 160, a single combination cut at a desired location in solar collector base 64 is made. Similar combination cuts are made at varying distances from central hole 62 by varying the placement of pivot rod 160 into holes 154.

Solar collector base 64 is now suitably configured to receive reflective material 34 on its surface (FIG. 14). Reflective material 34 is placed on the angled concentric surface 22 created by either hot-wire tool 80 or combination tool 110. As exemplary of the type of reflective material to be used, would be SS95 ™ film, currently made by Minnesota, Mining & Manufacturing, or glass mirrors, which are preferably front-silvered. Instead of reflective material 34 on surface 68 of solar collector base 64, photovoltaic cells (not shown), particularly those with high flux cells, could be used and placed at focus 58.

This particular configuration known as a fresnel configuration in the art is crucial to the success of the present invention. The fresnel configuration allows for a high concentration of the sun's energy, by focusing the energy on a central point, where moderately high temperatures are generated.

Figure 17:
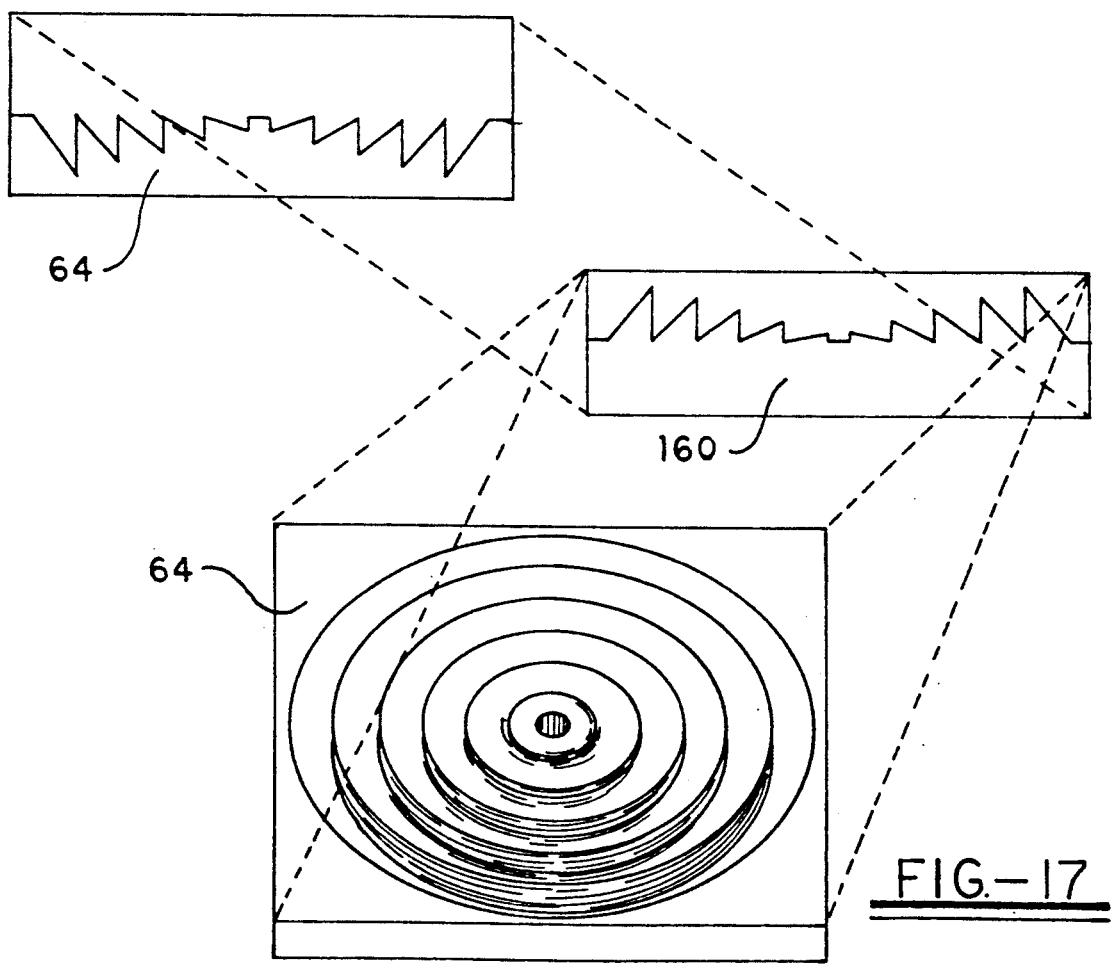
FIG. 17 illustrates a perspective view of a solar collector base being made from a negative mold of the original.

In an alternative embodiment, especially where the need exists to quickly produce more than one solar collector base 64, it is possible to use the formed base as a mold. By using this mold, it is possible to produce a negative 160 of original surface pattern 68 which has been formed by cutting tools 70, 80, or 110. As seen in FIG. 17, by following the sequence of steps outlined which make negative 160 from positive 64, by the process of pouring appropriate suitable molding reagent, such as a resin, onto original positive 64, negative 160 of the original is made. By using negative 160 as the new mold, it is now possible to mass produce appropriately configured solar collector bases from one original.

The cost of this type of solar device is very inexpensive. That is, the raw materials are economical as are tools (70, 80, 110) used to produce top surface 68 of solar collector 100 which are either purchased or constructed from a kit.

While in accordance with the patent statutes, the best mode and preferred embodiment of the invention have been described, it is to be understood that the invention is not limited thereto, but rather is to be measured by the scope and spirit of the appended claims.

What is claimed is:

1. A radial cutter for making a circular solar collector base comprising:
   a. a support means, said support means having a first surface and a second surface, said support means additionally having a first end and a second end, said support means additionally having a circular aperture near the first end of the support;
   b. a pivoting means capable of being inserted through the circular aperture of the support means;
   c. a plurality of spaced pins extending perpendicularly from the support with graduated heights on the first surface of the support means, wherein the pins graduate in height from a shortest pin adjacent to the pivot means at the first end to a longest pin at the second end of the first surface of the support means; and
   d. an electrical cutting means which is configured through the support means and the pins, the cutting means being capable of manually being repositioned from a first wrapping pattern in which a series of concentric rings are produced in the base, to a second wrapping pattern in which a series of beveled cuts are produced interfacing with the first series of concentric rings in the base.

2. The cutter of claim 1 wherein each of said pin has a slot at its extremity positioned along an axis normal to the longitudinal axis of the support means to receive the cutting means.

3. The cutter of claim 1 wherein the pivoting means is a dowel.

4. The cutter of claim 1 wherein the resistance cutting means is configured within the support means such that the cutting means is strung from the slot of the shortest pin means to the base of a next pin in a longitudinal direction toward the second end of the support means, said configuration forming a beveled cutter.

5. The cutter of claim 1 wherein the cutting means is a resistance wire.

6. The cutter of claim 1 wherein the electrical cutting means is manually tensioned by an adjustable tensioning means.

7. The cutter of claim 6 wherein the tensioning means further comprises a threaded pin with is capable of threaded engagement with a nut.

8. The cutter of claim 1 wherein the support means has a plurality of holes, one pair of holes for each pin to receive the cutting means therethrough, consisting of a first hole on one side of the pin along an axis normal to the longitudinal axis of the support means and a second hole along the same axis on the opposite side of the pin.

9. The cutter of claim 8 wherein the cutting means is configured within the support means such that it originates through the first hole adjacent to the pin, passes through a slot at the extremity of the pin, and exits through the second hole adjacent to the pin.

10. The cutter of claim 9 wherein the cutting means is connected serially from the shortest pin to the longest pin at the second end of the first surface of the support means.

11. A cutter for making a solar collector comprising:
a. a support means, said support means having a first surface and a second surface, said support means additionally having a first end and a second end, said support means having an opening at the second end and a plurality of openings at the first end;
b. a pivoting means capable of being inserted into one of the openings at the first end of the support means;
c. a height adjustment means extending perpendicularly from the support means containing a plurality of holes situated in an arcuate circle within the height adjustment means such that there is a correspondence between one said hole in the height adjustment means and an opening in the support means that will provide the appropriate angularity necessary to create a fresnel lens configuration; and
d. a cutting means which is positioned into the opening near the second end of the support means and pivotally attached to the support means at a first attachment point and adjustably positioned to the height adjustment means at a second attachment point.

12. The apparatus of claim 11 wherein the pivoting means is a dowel.

13. The apparatus of claim 11 wherein the cutting means is strung from a terminal point of a horizontal member, to a terminal point of a vertical member, and to an intersection point formed at the joining of an extension strut and a connecting member.

14. The apparatus of claim 13 wherein the cutting means is a resistance wire.

* * * * *